US009882631B2

(12) United States Patent
Clemmensen et al.

(10) Patent No.: US 9,882,631 B2
(45) Date of Patent: Jan. 30, 2018

(54) RECONFIGURABLE SATELLITE ACCESS POINTS AND SATELLITE ACCESS SITES

(71) Applicant: WorldVu Satellites Limited, St Helier, Jersey (GB)

(72) Inventors: Daniel Clemmensen, Great Falls, VA (US); Gregory Thane Wyler, Sewalls Point, FL (US)

(73) Assignee: WorldVu Satellites Limited, St Helier (JE)

( * ) Notice: Subject to any disclaimer, the term of this patent is extended or adjusted under 35 U.S.C. 154(b) by 0 days.

(21) Appl. No.: 14/945,229

(22) Filed: Nov. 18, 2015

(65) Prior Publication Data

US 2017/0141841 A1    May 18, 2017

(51) Int. Cl.
*H04B 7/185* (2006.01)
*H04W 24/02* (2009.01)
(Continued)

(52) U.S. Cl.
CPC ....... *H04B 7/18517* (2013.01); *H01Q 1/1235* (2013.01); *H01Q 1/42* (2013.01);
(Continued)

(58) Field of Classification Search
CPC .... H04B 7/18517; H01Q 1/1235; H01Q 1/42; H04W 24/02
See application file for complete search history.

(56) References Cited

U.S. PATENT DOCUMENTS 4,771,293 A * 9/1988 Williams ................. H01Q 1/08
343/757
7,397,435 B2 * 7/2008 McEwan ................ H01Q 1/084
343/713

(Continued)

FOREIGN PATENT DOCUMENTS

EP    0181221 A2    5/1986
WO    0145201 A1    6/2001

OTHER PUBLICATIONS

Authorized Officer: Tuomas Kauko, "International Search Report" dated Jan. 24, 2017 issued in counterpart International Application No. PCT/IB2016/056904, Publisher: PCT, Published in: EPO.
(Continued)

*Primary Examiner* — Moustapha Diaby
(74) *Attorney, Agent, or Firm* — Kaplan Breyer Schwarz, LLP

(57) ABSTRACT

A reconfigurable satellite access point including a transport-mounting structure and at least one antenna integrated with the transport-mounting structure, the transport-mounting structure allowing the satellite access point to be easily reconfigured between a shipping configuration and an deployed configuration, the satellite access point in the shipping configuration having a form factor of a shipping container which allows the satellite access point to be shipped to a remote satellite access site on earth and the satellite access point in the deployed configuration revealing the at least one antenna to the sky at the satellite access site. Further, a method for constructing and rapidly deploying a satellite access site, the method including integrating at least one antenna with a transport-mounting structure to create a satellite access point, configuring the satellite access point into a shipping configuration wherein the satellite access point has a form factor of a shipping container, shipping the satellite access point to a desired location on earth for the satellite access site, and reconfiguring the satellite access point into an deployed configuration at the satellite access site to reveal the at least one antenna to the sky.

39 Claims, 10 Drawing Sheets

(51) Int. Cl.
  *H01Q 1/12* (2006.01)
  *H01Q 1/42* (2006.01)
  *H01Q 3/08* (2006.01)
  *H01Q 19/13* (2006.01)

(52) U.S. Cl.
  CPC ............... *H01Q 3/08* (2013.01); *H01Q 19/13* (2013.01); *H04B 7/1858* (2013.01); *H04B 7/18573* (2013.01); *H04W 24/02* (2013.01)

(56) References Cited

U.S. PATENT DOCUMENTS

| | | | | |
|---|---|---|---|---|
| 2002/0028654 | A1* | 3/2002 | Gleyzes | H04B 7/18597 455/3.01 |
| 2008/0253838 | A1* | 10/2008 | Salemie | E02B 3/108 405/116 |
| 2013/0286870 | A1* | 10/2013 | Fujita | H04W 24/02 370/252 |
| 2014/0158854 | A1* | 6/2014 | Conrad | H01Q 1/12 248/544 |

OTHER PUBLICATIONS

Authorized Officer: Peter Kruck, "Written Opinion of the International Searching Authority" dated Jan. 24, 2017 issued in counterpart International Application No. PCT/IB2016/056904, Publisher: PCT, Published in: EPO.

* cited by examiner ized satellite communications systems. More particularly, the present disclosure relates to reconfigurable satellite access points (antenna systems) that can be rapidly deployed, and satellite access sites or antenna farms constructed from such satellite access points and related methods.

RECONFIGURABLE SATELLITE ACCESS POINTS AND SATELLITE ACCESS SITES

FIELD

The present disclosure relates to non-geostationary satellite communications systems. More particularly, the present disclosure relates to reconfigurable satellite access points (antenna systems) that can be rapidly deployed, and satellite access sites or antenna farms constructed from such satellite access points and related methods.

BACKGROUND

Satellite communications systems for bringing low-cost broadband Internet service to any location on the earth are currently being developed. FIG. 1 illustrates such a satellite communications system 10. As illustrated, the system 10 includes one or more satellite access sites (SAS) 12, also referred to as antenna farms. Each of the SASs 12 comprises individual satellite access points (SAPs) 14, also known as ground gateway antennas. The SASs 12, in some systems, may each include between four (4) and twenty (20) SAPs 14. Further, some of these systems, may comprise up to fifty (50) SASs 12 around the world.

As also illustrated in FIG. 1, the SAPs 14 of the SASs 12 may be connected to the Internet or other network and link the Internet or other network to a fleet of non-geostationary satellites 16, which in turn link to inexpensive user terminals 18 positioned on the earth. The user terminals 18 deliver Internet connectivity to user computers, such as laptops, and user cell phones and the like, in residences and businesses.

The SAPs 14 of the SAS 12 comprise relatively large tracking antenna assemblies. Therefore, a civil works project is currently required to construct an SAS 12.

Accordingly, an SAP is needed, which can be made and assembled at a manufacturing or like facility, and easily and quickly configured for shipping to a desired ground site and easily and quickly reconfigured for deployment at the ground site to rapidly construct a SAS.

SUMMARY

Disclosed herein is a reconfigurable satellite access point comprising, in various embodiments, a transport-mounting structure, and at least one antenna integrated with the transport-mounting structure, wherein the transport-mounting structure allows the satellite access point to be easily reconfigured between a shipping configuration and an deployed configuration, the satellite access point in the shipping configuration having a form factor of a shipping container which allows the satellite access point to be shipped to a remote satellite access site on earth and the satellite access point in the deployed configuration revealing the at least one antenna to the sky at the satellite access site.

Further disclosed herein is a method for constructing a satellite access site, the method comprising in various embodiment, integrating at least one antenna with a transport-mounting structure to create a satellite access point, configuring the satellite access point into a shipping configuration wherein the satellite access point has a form factor of a shipping container, shipping the satellite access point to a desired location on earth for the satellite access site, and reconfiguring the satellite access point into an deployed configuration at the site to reveal the at least one antenna to the sky.

BRIEF DESCRIPTION OF THE DRAWINGS

FIG. 4A depicts the SAP sub-units assembled to one another and where FIGS. 4B and 4C depict the SAP sub-units being optionally separated from one another and collapsed down into the deployed configuration during deployment of the SAP at a SAS.

DETAILED DESCRIPTION

Figure 1:
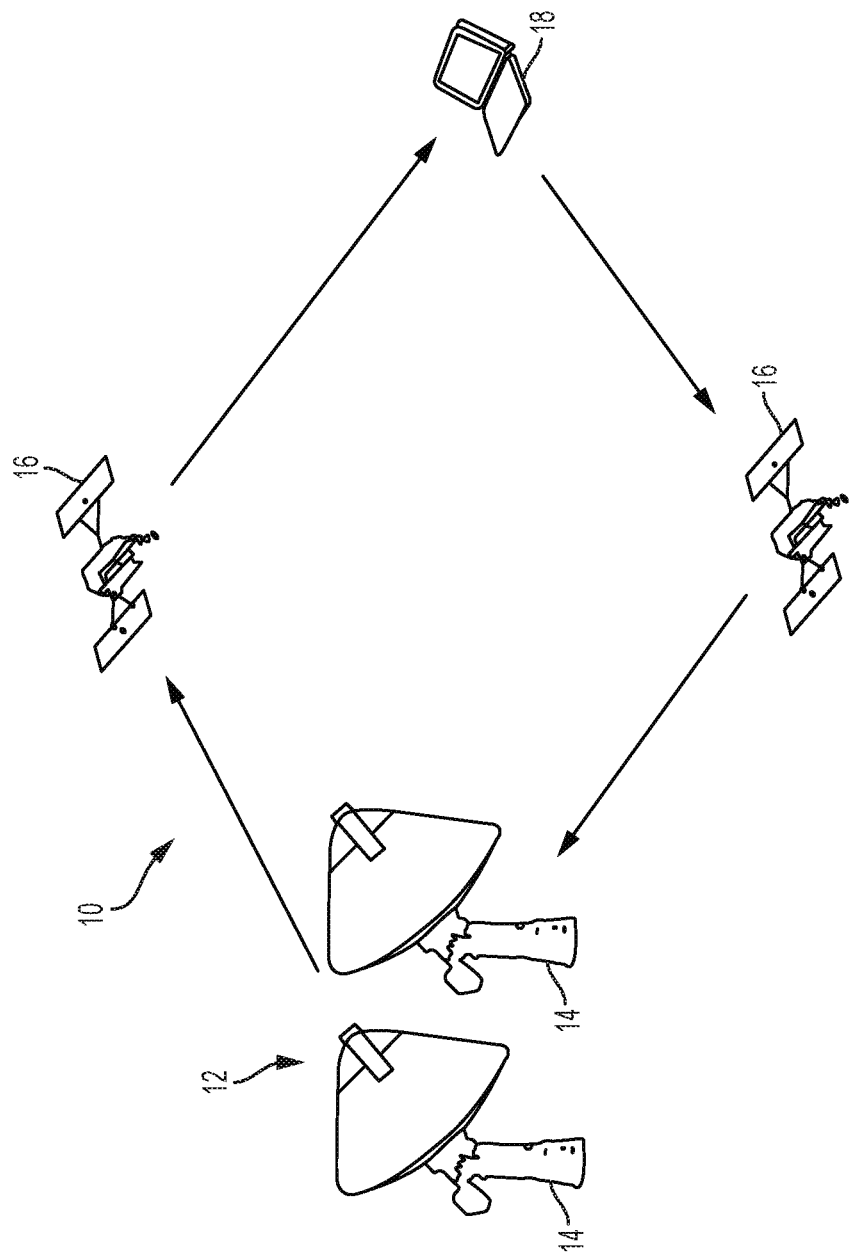
FIG. 1 is a schematic illustration of an embodiment of a prior art satellite communications system according to the present disclosure.
Figure 2A:
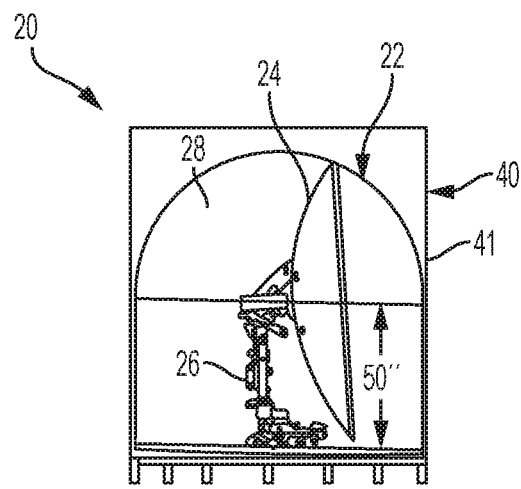
FIG. 2A is an end elevational view of an embodiment of a reconfigurable satellite access point (SAP) according to the present disclosure.
Figure 2B:
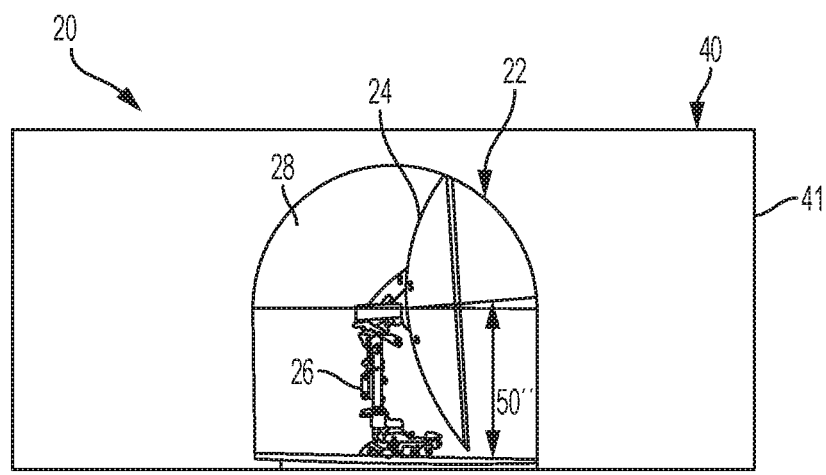
FIG. 2B is a side elevational view of the shippable SAP of FIG. 2A.

FIGS. 2A and 2B illustrate a reconfigurable SAP 20 that can be shipped to an SAS and rapidly deployed thereat, according to an embodiment of the present disclosure. The SAP 20 comprises one or more antennas 22 integrated with a transport-mounting structure 40. When configured in a shipping configuration, the SAP 20 can have a form factor of a shipping container, such as an ISO-standard intermodal shipping container, which allows the SAP 20 to be shipped without further preparation to an SAS. Once at the SAS, the SAP 20 can be easily and quickly reconfigured by collapsing the SAP 20 down into a deployed configuration to deploy the SAP 20 at the SAS.

The antenna 22 of the SAP 20 can comprise a parabolic dish antenna 24. In other embodiments, the antenna 22 can comprise a phased array antenna or a horn antenna. In still other embodiments, the antenna assemblies can have antenna designs (e.g. parabolic, phased array, horn) that vary from one or more of the antenna assemblies to another, if desired. In some embodiments, a radome 28 (illustrated in FIGS. 2A and 2B) may be provided to cover the antenna 22. The radome 28 in such embodiments operates as a protective shell for the antenna 22.

In some embodiments, the transport-mounting structure 40 can include a rigid receptacle sub-structure 41 and a pedestal sub-structure 26. The receptacle sub-structure 41 is specifically designed, in terms of shape, size, weight, and strength (wall thickness, ribbing, etc.), for the particular antenna 22 selected for use in the SAP 20, and in some embodiments, the particular antenna electronics, which will be integrated therewith. The pedestal sub-structure 26 connects the antenna 22 with the receptacle sub-structure 41 and can be adapted to mechanically move the antenna 22 relative to the receptacle sub-structure 41. More specifically, the pedestal sub-structure 26 may comprise one or more motors (not shown) that mechanically move the antenna 22 relative to the receptacle sub-structure 41. In some embodiments, the pedestal sub-structure 26 may have a first motor, which tilts the antenna relative to the receptacle sub-structure 26 and a second motor that spins or rotates the antenna relative to the receptacle sub-structure 41.

In some embodiments, antenna electronics (not shown) may be integrated with the transport-mounting structure 40. The antenna electronics can comprise a motor controller, RF equipment for transmitting and receiving data, and a modem for allowing the SAP 20 to communicate with a central controller of an associated SAS and to receive power from a power converter system of the associated SAS.

Figure 3A:
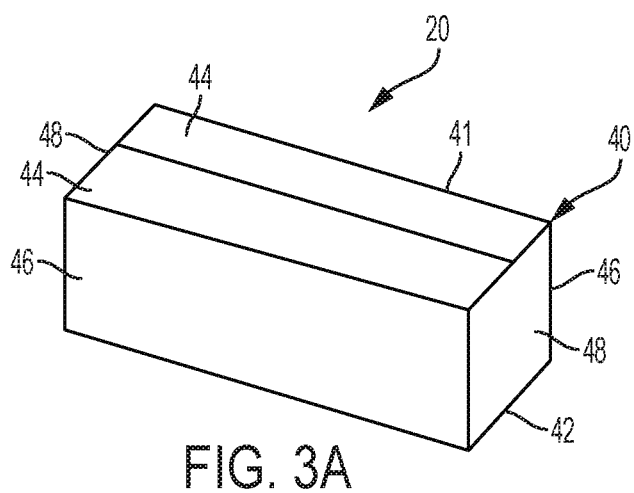
FIG. 3A is a perspective view of the SAP shown in FIGS. 2A and 2B, in a folded state or assembled into a shipping configuration for shipping.
Figure 3B:
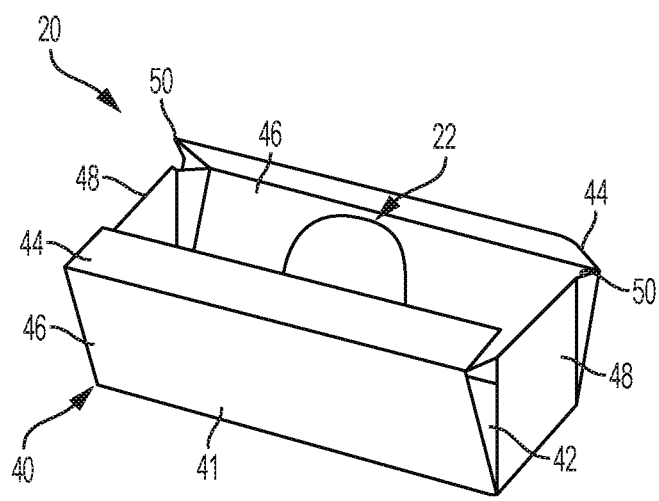
FIGS. 3B-3E are perspective views of the SAP shown in FIG. 3A, as it is reconfigured by collapsing it down into a deployed configuration during deployment of the SAP at a SAS.
Figure 3C:
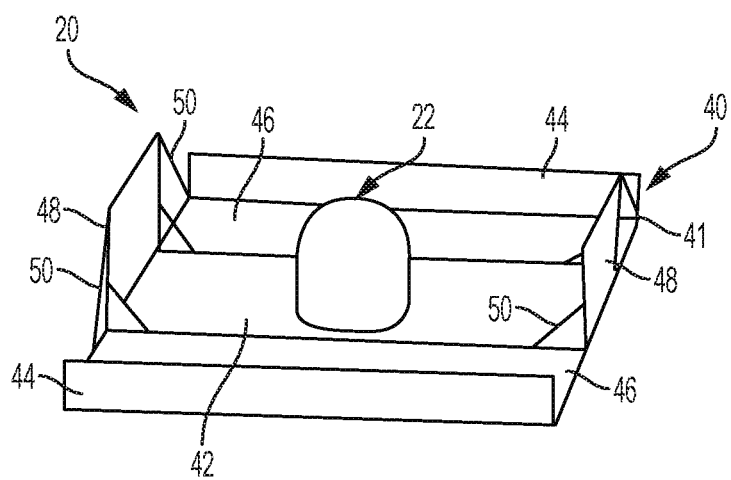
Figure 3D:
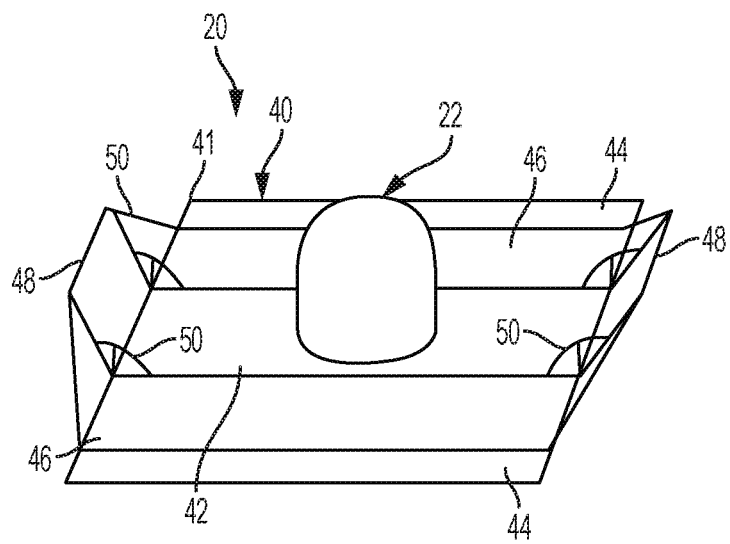

Referring to FIG. 3A, the receptacle sub-structure 41 of the transport-mounting structure 40, in one embodiment, may comprise a base 42, opposing top wall sections 44, opposing side walls 46, and opposing end walls 48. The base 42 may be unitary with or integrally connected to the pedestal sub-structure 26. To allow the SAP 20 to be reconfigurable between the shipping and deployed configurations, the top wall sections 44 can be pivotally and/or removably attached to a corresponding one of the side walls 46 (and/or end walls 48 in other embodiments), and the side walls 46 and the end walls 48 can be pivotally and/or removably attached to the base 42. The receptacle sub-structure 41 can be made from a hard protective material and/or combination of materials.

In some embodiments, the SAP 20 can be placed in the shipping configuration by pivotally moving the receptacle sub-structure side and end walls 46, 48 up relative to the base 42 into the form of an open shipping container (e.g., an ISO-standard intermodal shipping container), and pivotally moving the top wall sections 44 relative to the side and end walls 46, 48 to close the receptacle sub-structure 41, so that the SAP 20 can be shipped to a desired SAS without further preparation. Once at the SAS, the SAP 20 can be collapsed down into the deployed configuration by pivotally moving the top wall sections 44 relative to the side and end walls 46, 48, and pivotally moving the side and end walls 46, 48 relative to the base 42, to open and collapse the receptacle sub-structure 41 of the SAP 20 down onto the ground to uncover the antenna 22 to allow for power and network connection of the SAP 20. In other embodiments, the SAP 20 can be placed in the shipping configuration by attaching the receptacle sub-structure walls 46, 48 to the base 42 so that it takes the form of an open shipping container, and attaching the top wall sections 44 to the side and end walls 46, 48 to close the receptacle sub-structure 41, so that the SAP 20 can be shipped to a desired SAS without further preparation. Once at the SAS, the SAP 20 can be collapsed down into the deployed configuration by detaching the top wall sections 44 from the side and end walls 46, 48, and detaching the walls 46, 48 from the base 42 to uncover the antenna 22 and allow for power and network connections of the SAP 20. In still other embodiments, the SAP 20 can be placed in the shipping configuration by attaching and/or pivotally moving the side and end walls 46, 48 up relative to the base 42 into the form of an open shipping container, and attaching and/or pivotally moving the top wall sections 44 relative to the side and end walls 46, 48 to close the receptacle sub-structure 41, so that the SAP 20 can be shipped to a desired SAS without further preparation. Once at the SAS, the SAP 20 can be collapsed down into the deployed configuration by detaching and/or pivotally moving the top wall sections 44 relative to or from the side and end walls 46, 48, and detaching and/or pivotally moving the side and end walls 46, 48 relative to or from the base 42, to uncover the antenna 22 and allow for power and network connection of the SAP 20.

Connectors (not shown) can be provided for pivotally and/or removably attaching each top wall section 44 to a corresponding one of the side walls 46 and pivotally and/or removably attaching the side walls 46 and the end walls 48 to the base 42. In some embodiments, the connectors can comprise a hinge arrangement, fastener (e.g., quick-connect fastener), or other arrangement. The hinge arrangements may comprise, without limitation, living hinges, barrel hinges, piano hinges, combinations thereof or any other suitable arrangement that allows the top, side and end walls 44, 46, 48 to be pivotally and/or removably attached to one another to allow reconfiguration of the SAP receptacle sub-structure 41 between the shipping and deployed configurations, as illustrated in FIGS. 3A-3E.

Removable pins (not shown) or other means can be used to lock the side and end walls 46, 48 of the SAP receptacle sub-structure 41 in a vertical or upright position (open shipping configuration) and to lock the top wall section 44 in a horizontal or closed position (closed shipping configuration) so that the SAP 20 can be shipped. The removable pins or other means allow the walls 44, 46 48 to be unlocked and lowered without special tools when the SAP 20 is collapsed down into the deployed configuration. Slow release lines 50, struts, ballast arms, and/or other means can be provided for allowing the side and end walls 46, 48 to pivot down onto the ground in a controlled and/or automatic manner to rapidly collapse the SAP 20 down into the deployed configuration, as illustrated in FIGS. 3B-3E.

Figure 3E:
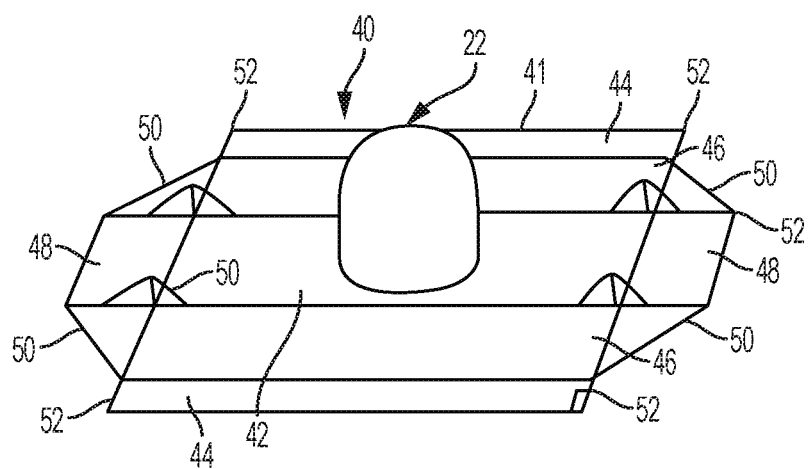

Once in the deployed configuration, one or more of the top wall sections 44, side walls 46 and end walls 48 can be can be locked into position using stakes 52 and/or other suitable fasteners that extend through holes (not visible) provided through the walls 44, 46, 48 of the receptacle sub-structure 41, as illustrated in FIG. 3E. In other embodiments, the top wall sections 44, side walls 46 and end walls 48 can be adapted to automatically lock when pivoted down to the ground. For example, in some embodiments, the hinge arrangements may be adapted to automatically lock when the walls 44, 46, 48 reach the pivoted down position (in the deployed configuration), thereby retaining the walls 44, 46, 48 in the pivoted down position. In other embodiments, the slow release lines 50, struts, and/or ballast arms can be adapted to automatically lock when the walls 44, 46, 48 reach the pivoted down position, thereby retaining the walls 44, 46, 48 in the pivoted down position. In other embodiments, the stakes, bolts, or other manual locking means can be used in conjunction with the automatic locking means, if required or desired.

After placing the SAP 20 in the deployed configuration, only power and data cable connections are needed to complete the deployment.

In some embodiments, the SAP 20 can be provided with solar panels which are attached to the interior surfaces of the top wall sections 44, the side wall, and/or end walls 48 of the receptacle sub-structure 41. The solar panels can be adapted and configured to automatically begin charging and powering the SAP 20 when the SAP is collapsed down into the deployed configuration.

Figure 4A:
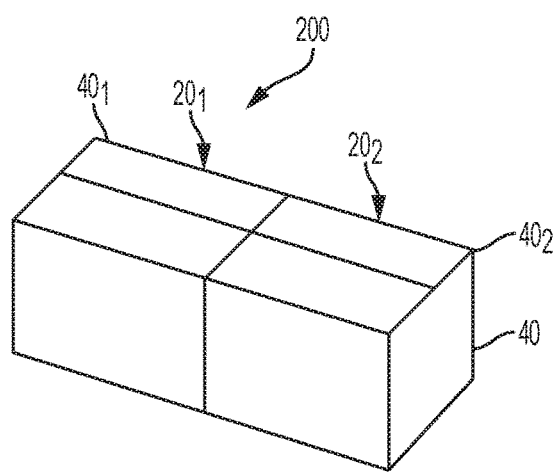
FIGS. 4A-4C are perspective views of another embodiment of the SAP comprising two SAP sub-units where
Figure 4B:
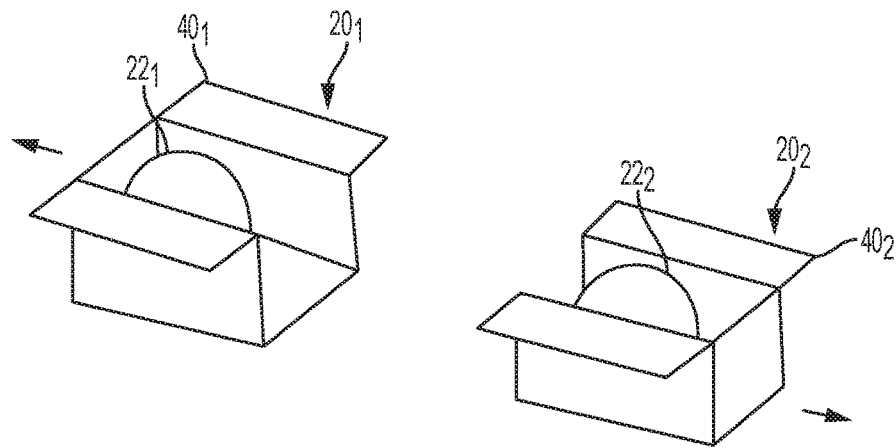

As illustrated in FIG. 4A, in some embodiments comprising smaller antennas or large antennas that can be shipped in smaller sections, the SAP 200 may comprise multiple SAP sub-units $20_1$ and $20_2$ mechanically connected into a single unit. In such embodiments, each SAP sub-unit $20_1$, $20_2$ includes integrated transport-mounting structures $40_1$, $40_2$ and antennas or antenna sections $22_1$, $22_2$ (FIG. 4B). The SAP sub-units $20_1$, $20_2$ can be mechanically connected to one another as illustrated in FIG. 4A, using bolts or some other fastener arrangement, to form a single shippable and rapidly deployable SAP 200 that has the form factor of a shipping container such as an ISO-standard container. For example, in one embodiment, each antenna $22_1$ $22_2$ may comprise, for example, a 1.9 meter diameter parabolic dish antenna and the optional radome. Such dimensioned antennas $22_1$, $22_2$ can be integrated with appropriately configured transport-mounting structures $40_1$, $40_2$ each having a form factor of a 20 foot long container, which when mechanically connected together form a 40 foot long SAP 200, as illustrated in FIG. 4A, which can be shipped to the site of the SAS. Upon reaching the SAS site, the SAP 200 can be rapidly deployed by collapsing the SAP 200 down into the deployed configuration, as described earlier.

Figure 4C:
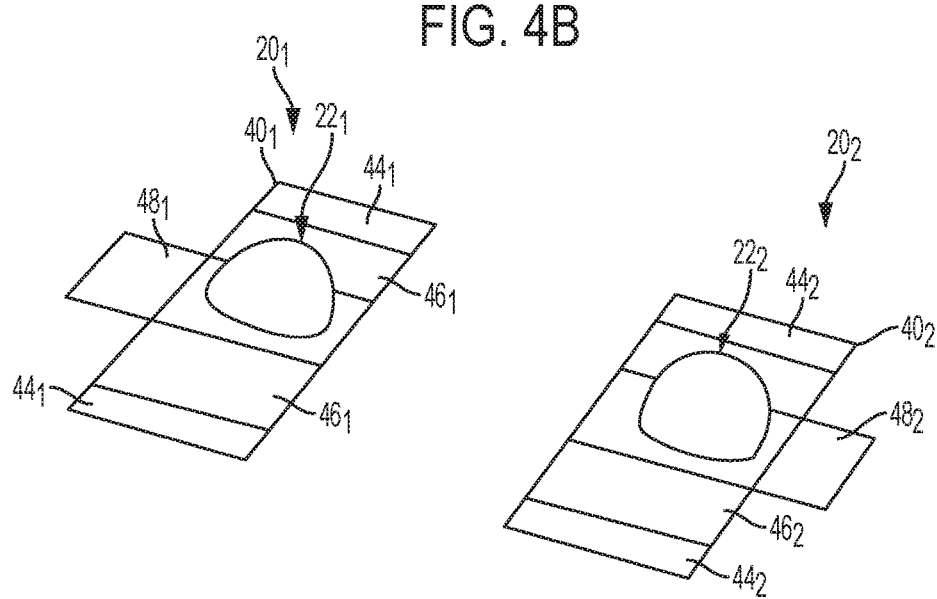

Providing two antennas $22_1$ and $22_2$ at opposite ends of the 40 foot long SAP 200 may have a separation distance that is sufficient. More specifically, the separation distance between the antennas $22_1$, $22_2$ should be sufficient to prevent the antennas $22_1$, $22_2$ from pointing through one another to observe the sky at low (10-15 degrees) elevation angles. If the separation distance is not sufficient and it still desired to ship an SAP with 2 (or more antennas), then upon reaching the SAS site, the SAP 200 can be rapidly deployed by separating the SAP sub-units $20_1$ and $20_2$ from one another and dragging or hoisting them into their desired positions (e.g., to avoid pointing through one another) as illustrated in FIG. 4B and collapsing down each of the SAP sub-units $20_1$, $20_2$ into the deployed configuration, as illustrated in FIG. 4C.

Figure 5:
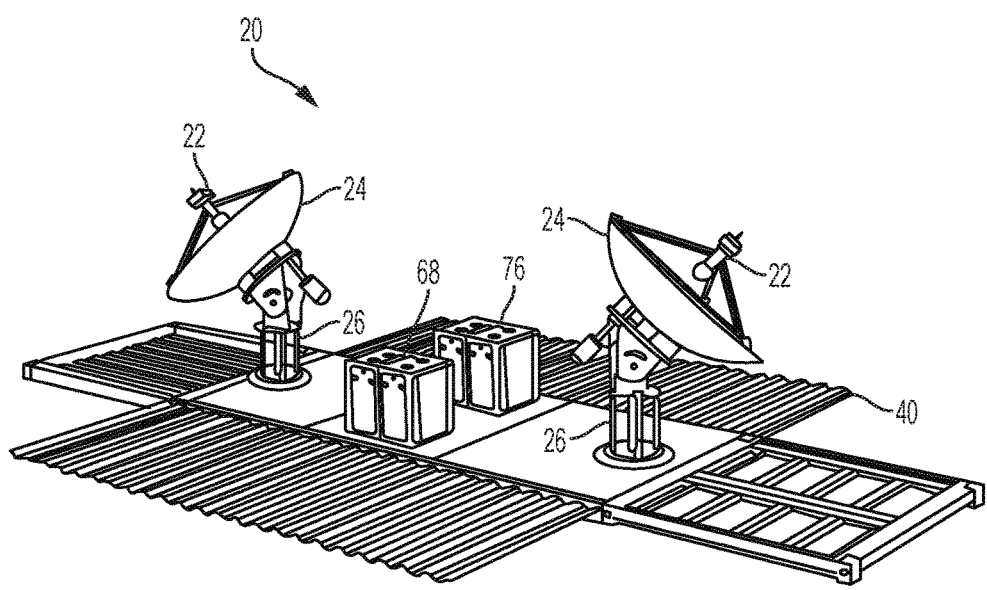
FIG. 5 is another embodiment of the SAP.

FIG. 5 illustrates an embodiment of the SAP where the antennas 22 do not include the radome. In such an embodiment, each of the antennas 22 can comprise a parabolic dish antenna 24 having a diameter up to 2.4 meters.

In addition to the antenna 22 and the transport-mounting structure 40, the SAP 20, 200 may further include other SAS equipment integrated therein including but not limited to a central controller 68 (where no separate container is provided for such equipment), and the one or more motors for moving the antenna 22 can be pre-wired. Therefore, the only connections for completing the installation of the SAP 20, 200 are power for the SAP 20, 200 from a local power grid (either 110, 220 or 440 depending on what is available) and some form of Ethernet cable to connect the SAP 20, 200 to the Internet or other network.

The antennas 22 transmit and receive signals, which are then transformed and aggregated in a terrestrial communications system. In various embodiments, the communications system may be a digital network, and in some embodiments of such a system, the data will be IP ("layer 3") that is forwarded by a central controller that includes a router. In other embodiments, such a system may use digital samples ("layer 1") or WAN Ethernet ("layer 2"), which can be handled by other types of controllers.

The reconfigurable SAPs 20, 200 (and other SAS equipment) of the present disclosure can each be controlled and managed by a central controller of the SAS to thereby form a rapidly deployable SAS. In some embodiments, each of the SAPs 20, 200 may be placed anywhere on the earth, and using a GPS unit provided with each of the SAPs 20, 200, notify the central controller of its location and availability, thus allowing most of the configuration process to be automated. The central controller of the SAS will then be capable of automatically commanding the SAPs 20, 200 to perform their functions including satellite tracking and data forwarding.

Figure 6:
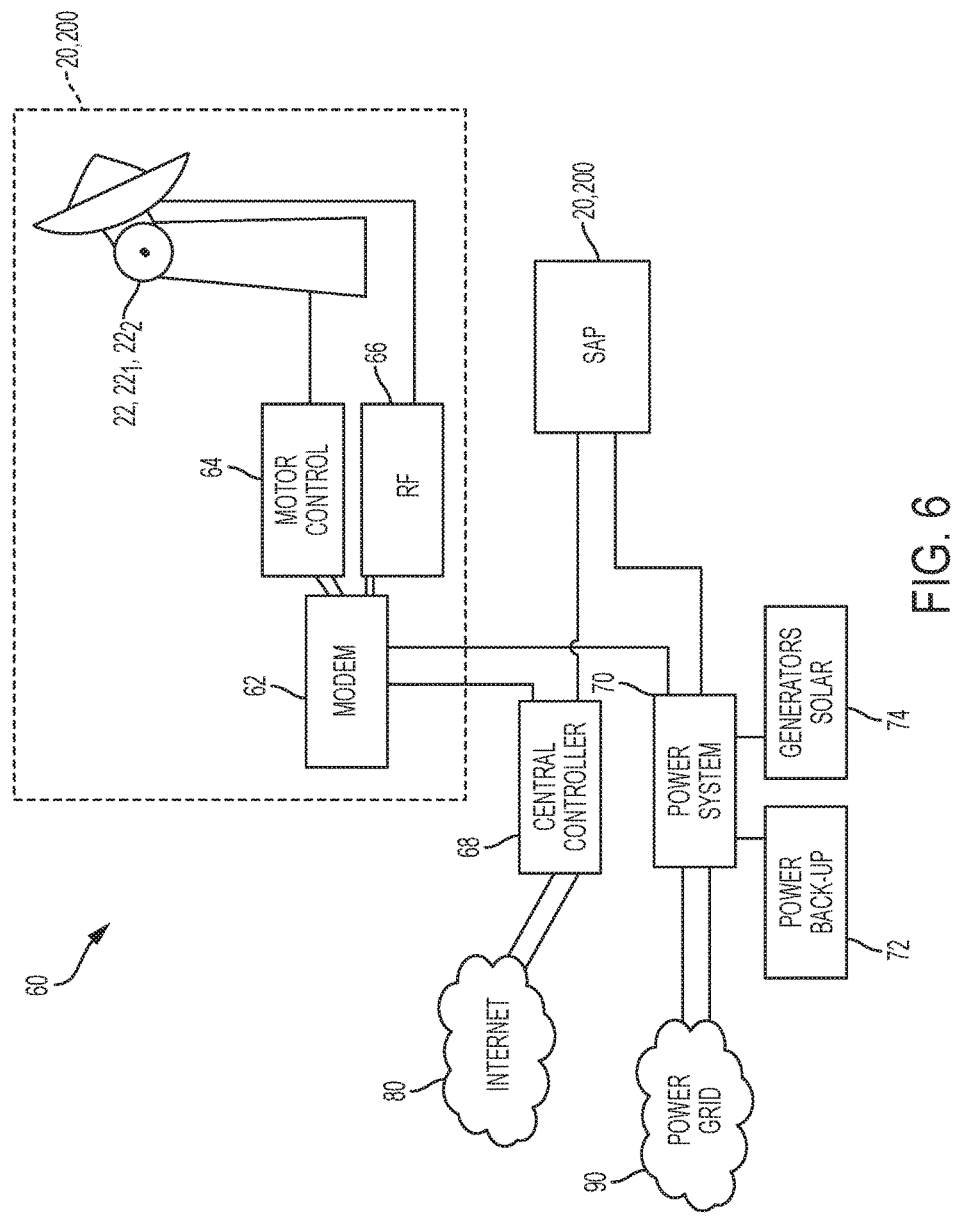
FIGS. 6-9 are block diagrams of various embodiments of a SAS.

FIG. 6 is a block diagram of an SAS 60 according to an embodiment of the present disclosure. The SAS 60 is constructed from a plurality of the earlier described SAPs 20, 200, which may be placed anywhere on the earth. The antenna electronics of each SAP 20, 200 can include a modem 62, which communicates with the central controller 68 of the SAS 60 and converts data from digital bit streams received from the central controller 68, to analog waveforms suitable for transmission out of the antennas 22, $22_1$, $22_2$ of the SAP 20, 200. The modem 62 also converts analog waveforms received by the antennas 22, $22_1$, $22_2$ to digital bit streams, which are communicated to the central controller 68 of the SAS 60. The antenna electronics of the SAPs 20, 200 may further comprise RF components 66 which amplify and filter the analog waveforms and a motor controller 64 which points the antennas of the antennas 22, $22_1$, $22_2$, such that they always track the correct satellite. The central controller 68 of the SAS 60 connects the SAS 60 to the Internet 80 or other network. The central controller 68, in typical embodiments, can comprise a router, which directs data traffic between the Internet 80 or other network and the SAPs 20, 200 at the site of the SAS 60. The SAS 60 further includes an SAS power converter system 70, which connects to an external local power grid 90. The power converter system 70 converts the power supplied by the power local grid 90 (e.g., 250V at 50 Hz) to the power requirements of the SAPs 20, 200 (e.g., 120 V AC). The SAS 60 can further include one or more auxiliary power systems in case the local power grid 90 fails. In the embodiment of FIG. 6, the auxiliary power systems include a power back-up system 72 (e.g., batteries) and a diesel generator and/or solar panels 74.

In some embodiments, the SAS 60 can include a low data-rate global interconnection to one or more satellite systems, using for example, Iridium (e.g., Iridium phone on a post), such that once dropped off a delivery vehicle, the SAS 60 can always be in contact with the cloud (a network of remotely located servers hosted on the Internet) or other network, to begin set-up and receive initialization instructions. The can provide low-rate data connectivity to the central controller or even to a user in the event that the wired Internet connection is temporarily lost.

The SAS 60 allows a plurality of reconfigurable SAPs 20, 200 to be connected together by the central controller 68 locally where all of the SAPs 20, 200 together would form a switch moving Internet traffic between satellites and any other medium, wired or wireless, which can pass such traffic. In other words, data can pass from any SAP 20, 200 to any SAP 20, 200, or from any SAP 20, 200 to the Internet 80.

Figure 7:
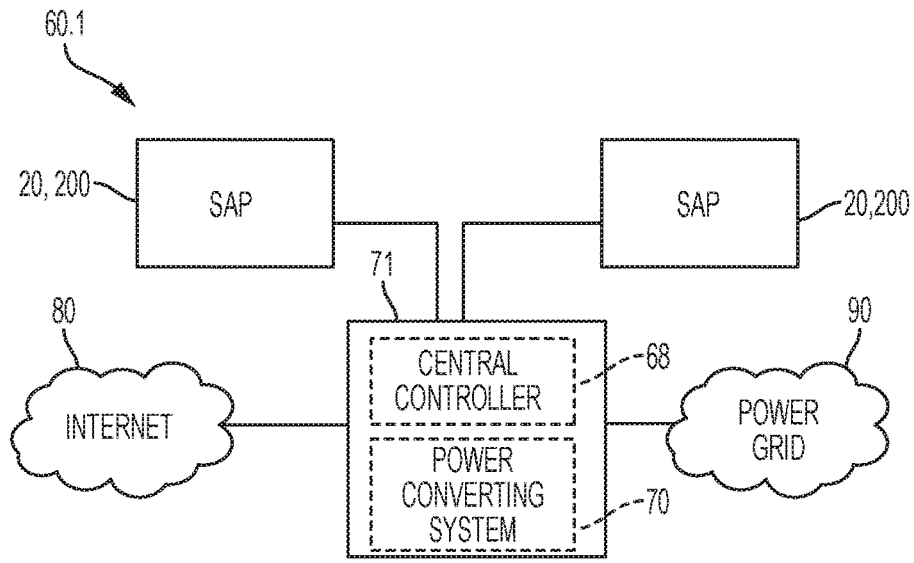

FIG. 7 is a block diagram of an SAS 60.1 according to another embodiment of the present disclosure. As illustrated, the central controller 68 and power converter system 70 of the SAS 60.1 are combined into a single shipping container 71.

Figure 8:
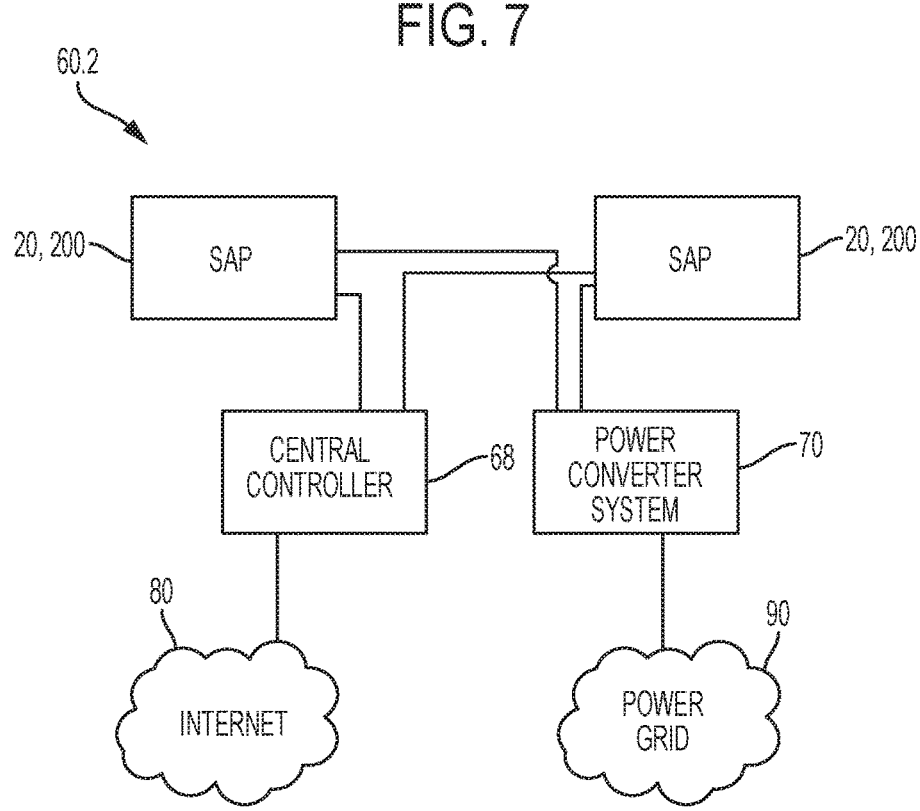

FIG. 8 is a block diagram of an SAS 60.2 according to further embodiment of the present disclosure. As illustrated, the central controller 68 and power converter system 70 (and any auxiliary power systems) of the SAS 60.2 are provided in separate containers.

Figure 9:
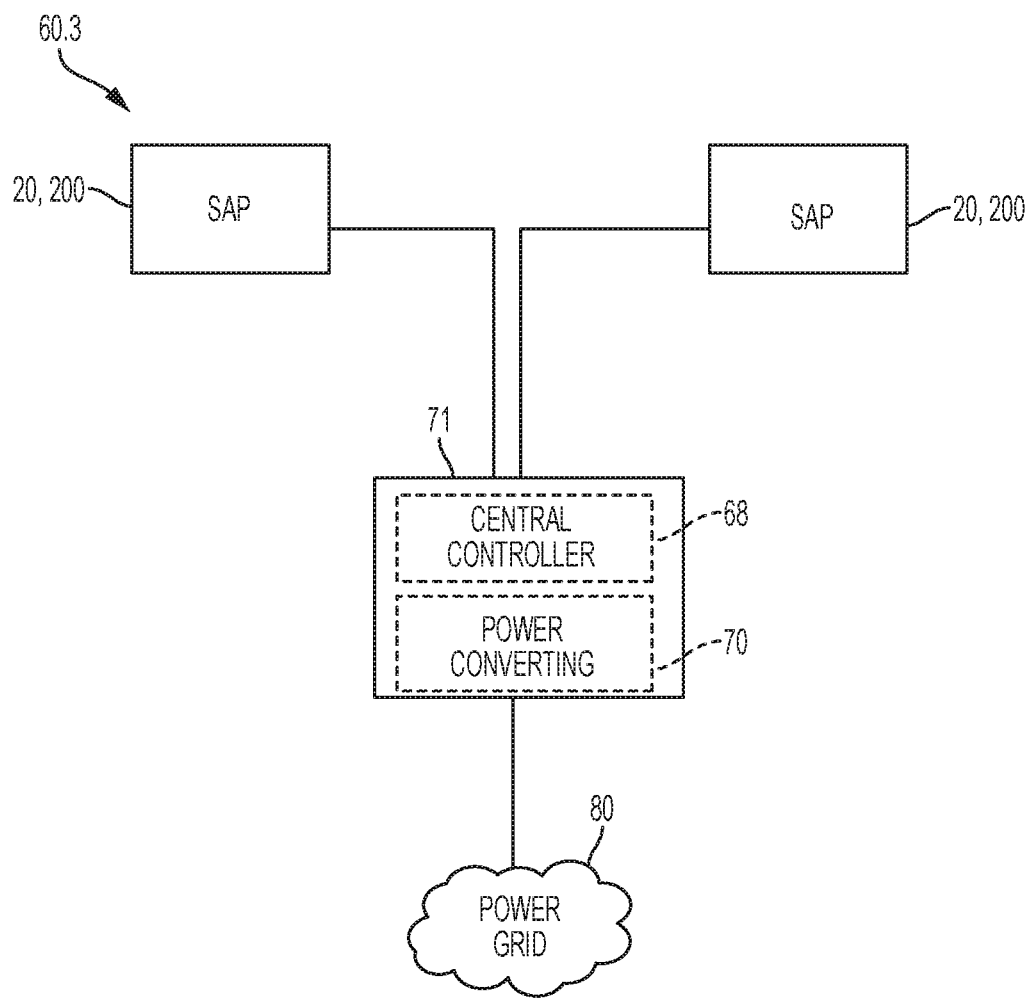

FIG. 9 is a block diagram of an SAS 60.3 according to a further embodiment of the present disclosure. As illustrated, the SAS 60.3 the central controller 68 and power converter system 70 are combined into a single shipping container 71 where the power converter system 70 is connected to a local power grid 80 and where the central controller 68 is not connected to the Internet of other network. This is made possible by pointing the antenna(s) of one of the SAPs 20, 200 to one satellite and pointing the antenna(s) of the other SAP 20, 200 to another satellite to act as a relay between the satellites without using the Internet or other network.

Figure 10:
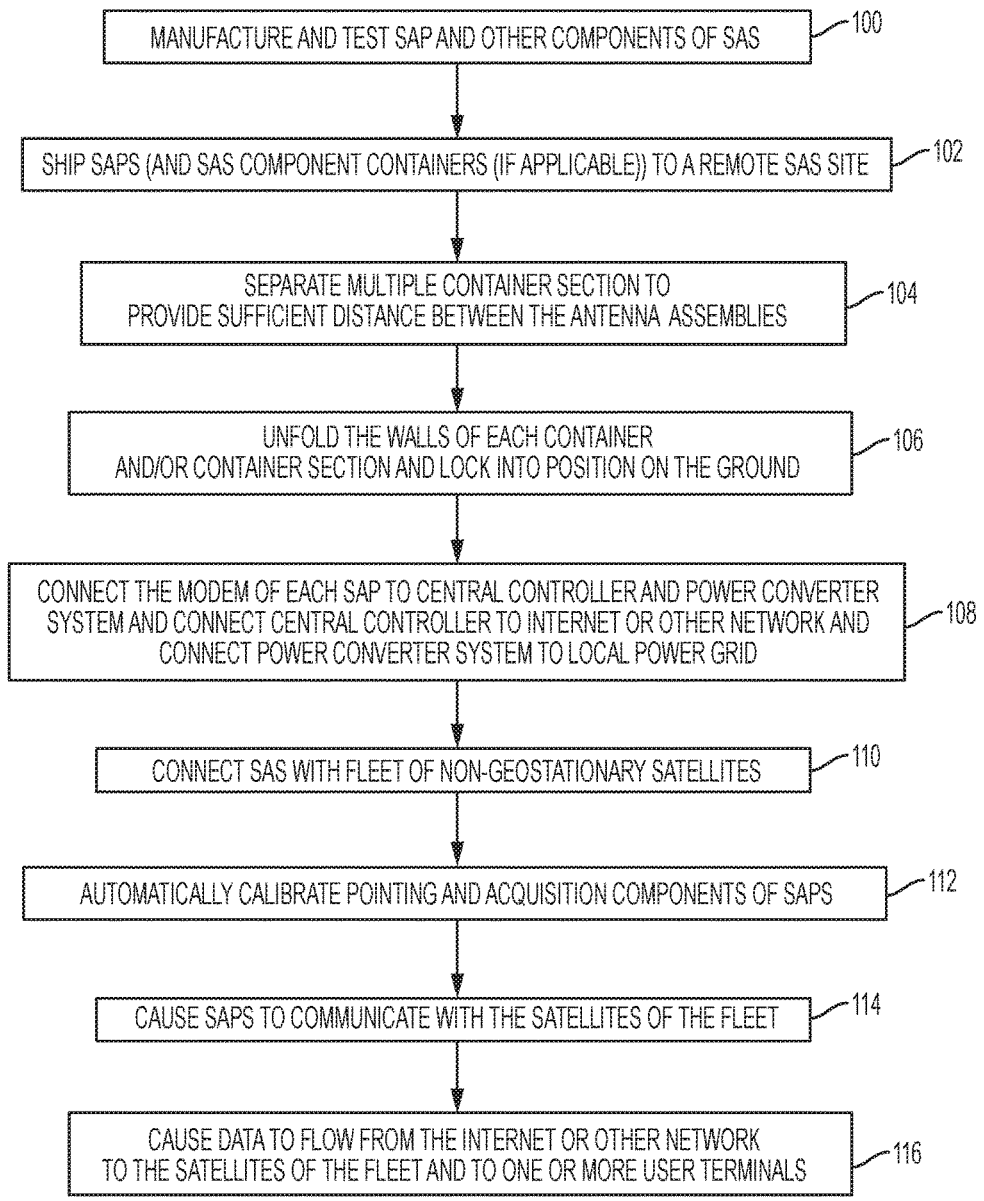
FIG. 10 is a flowchart illustrating a method for constructing and rapidly deploying an SAS according an embodiment of the present disclosure.

FIG. 10 is a flowchart of a method for constructing an SAS according to an embodiment of the present disclosure. Starting with box 100, the antenna(s), modem, motor controller, RF components, transport-mounting structure(s) and any other components of the SAPs, and the central controller, power converter system (if applicable), one or more auxiliary power systems (if applicable) and any other components of the SAS are manufactured at one or more manufacturing facilities. In some embodiments, one or more of the antennas and corresponding other SAP components are integrated with one or more transport-mounting structures to construct a SAP, and the central controller, power converter system (if applicable) and one or more auxiliary power systems (if applicable) are provided together or separately in their own shippable containers. In other embodiments, one or more of the central controller, power converter system, and one or more auxiliary power systems can be integrated into the SAP with the transport-mounting structure(s) and the antenna(s). The SAPs and SAS components are then operationally tested and the walls of each SAP receptacle sub-structure are then folded up and/or assembled into the shipping configuration.

In box 102, the SAPs and SAS component containers (if applicable) are shipped to a remote SAS site using the appropriate shipping vehicle or vehicles. Once at the SAS site, the SAPs and SAS component containers (if applicable) are removed from the shipping vehicle using, for example, a crane or bracing jacks, and placed at a desired position at the SAS site.

If the SAPs are constructed from multiple SAP sub-units, and need to be separated to provide sufficient distance between the antennas and the like, then in box 104, the SAP sub-units are separated from one another and at least one of the SAP sub-units is moved and placed in a desired position at the SAS site.

In box 106, the walls of each SAP or SAP sub-unit receptacle sub-structure are collapsed into the deployed configuration and locked into position on the ground.

In box 108, the modem of each SAP is connected to the central controller and the power converter system. Further, the central controller is connected to the Internet or other network and the power converter system is connected to the local power grid.

In box 110, the SAS connects with a fleet of non-geostationary satellites through the Internet or other network. In box 112, the SAPs automatically calibrate their pointing and acquisition components. In box 114, the SAPs make contact with the satellites of the fleet and in box 116, data flows from the Internet or other network to the satellites of the fleet and to one or more user terminals.

Although the shippable and rapidly deployable SAP and SAS have been described in terms of illustrative embodiments, they are not limited thereto. Rather, the appended claims should be construed broadly to include other variants and embodiments of same, which may be made by those skilled in the art without departing from the scope and range of equivalents of the SAP and SAS.

What is claimed is:

1. A reconfigurable satellite access point comprising:
a transport-mounting structure; and
at least one antenna integrated with the transport-mounting structure;
wherein the transport-mounting structure allows the satellite access point to be easily reconfigured between a shipping configuration and a deployed configuration, the satellite access point in the shipping configuration having a form factor of a shipping container which allows the satellite access point to be shipped to a remote satellite access site on earth and the satellite access point in the deployed configuration revealing the at least one antenna to the sky at the satellite access site;
wherein the transport-mounting structure comprises a receptacle sub-structure, the receptacle sub-structure including a base and at least one wall, the base for mounting the satellite access point on the ground at the satellite access site, the at least one wall and the base enclosing the at least one antenna during shipping, the at least one wall comprising an end wall and a side wall, the end wall and the side wall each separately pivotally movable relative to the base, or the end wall and the side wall each separately detachable from the base, or the end wall and the side wall each separately pivotally movable relative to and detachable from the base, to reveal the at least one antenna to the sky at the satellite access site.

2. The satellite access point of claim 1, wherein the receptacle substructure further includes at least one connector for allowing pivotal movement of the end wall and/or the side wall relative to the base, or allowing the end wall and/or the side wall to be detached from the base, or for allowing pivotal movement of the end wall and/or the side wall relative to the base and allowing the end wall and/or the side wall to be detached from the base.

3. The satellite access point of claim 1, wherein the receptacle sub-structure further includes a top wall or top wall sections.

4. The satellite access point of claim 3, wherein the receptacle sub-structure further includes at least one connector for at least one of pivotally and removably attaching the top wall or top wall sections to the at least one wall allowing pivotal movement of the top wall or top wall sections relative to the at least one wall, or allowing the top wall or top wall sections to be detached from the at least one wall, or for allowing pivotal movement of the top wall or top wall sections relative to the at least one wall and allowing the top wall or top wall sections to be detached from the at least one wall.

5. The satellite access point of claim 3, wherein the receptacle sub-structure further includes a slow release mechanism for automatically pivoting the top wall or top wall sections or for allowing the top wall or top wall sections to be at least one of manually pivoted and manually detached in a controlled manner.

6. The satellite access point of claim 3, further comprising a fastener for fastening the top wall or top wall sections to the ground at the satellite access site.

7. The satellite access point of claim 1, wherein the receptacle sub-structure further includes a slow release mechanism for automatically pivoting the end wall and/or the side wall or for allowing the end wall and/or the side wall to be at least one of manually pivoted and manually detached in a controlled manner.

8. The satellite access point of claim 7, wherein the slow release mechanism is integrated with at least one of the at least one connector.

9. The satellite access point of claim 1, further comprising at least one fastener for fastening the end wall and/or the side wall to the ground at the satellite access site.

10. The satellite access point of claim 1, wherein the satellite access point comprises at least two satellite access point sub-units detachably connected to one another.

11. The satellite access point of claim 10, wherein the at least one antenna comprises a plurality of antennas, and wherein each of the satellite access point sub-units includes at least one of the antennas.

12. The satellite access point of claim 1, further comprising antenna electronics.

13. The satellite access point of claim 12, wherein the antenna electronics comprises a modem, a motor controller and RF equipment.

14. The satellite access point of claim 1, further comprising satellite access site equipment.

15. The satellite access point of claim 14, wherein the satellite access site equipment comprises at least one of a central controller, a power converter system, and an auxiliary power system.

16. A rapidly deployable satellite access site comprising at least one of the satellite access points of claim 1.

17. A method for constructing a satellite access site, the method comprising:
   integrating at least one antenna with a transport-mounting structure to create a satellite access point, the transport-mounting structure comprising a receptacle sub-structure, the receptacle sub-structure including a base and at least one wall, the base for mounting the satellite access point on the ground at the satellite access site, the at least one wall and the base for enclosing the at least one antenna during shipping, the at least one wall comprising an end wall and a side wall, the end wall and the side wall each separately pivotally movable relative to the base, or the end wall and the side wall each separately detachable from the base, or the end wall and the side wall each separately pivotally movable relative to and detachable from the base to reveal the at least one antenna, to the sky at the satellite access site;
   configuring the satellite access point into a shipping configuration wherein the satellite access point has a form factor of a shipping container;
   shipping the satellite access point to a desired location on earth for the satellite access site; and
   reconfiguring the satellite access point into a deployed configuration at the site to reveal the at least one antenna to the sky.

18. The method of claim 17, further comprising testing the satellite access point prior to shipping.

19. The method of claim 17, further comprising removing the satellite access point from a shipping vehicle at the desired location on the earth for the satellite access site.

20. The method of claim 17, further comprising connecting the at least one antenna assembly of the satellite access point to other satellite access site components to one another at the desired location on the earth.

21. The method of claim 20, further comprising connecting the other satellite access site components to at least one of the Internet or other network and a local power grid.

22. The method of claim 21, wherein the satellite access point comprises at least two satellite point sub-units detachably connected to one another.

23. The method of claim 22, wherein the at least one antenna comprises a plurality of antennas, and wherein each of the satellite access point sub-units includes at least one of the antennas.

24. The method of claim 23, further comprising separating the satellite access point sub-units to provide sufficient distance between the at least one antennas.

25. The method of claim 21, wherein the satellite access point further comprises antenna electronics.

26. The method of claim 25, wherein the antenna electronics comprises a modem, a motor controller and RF equipment.

27. The method of claim 21, wherein the components further comprise satellite access site equipment.

28. The method of claim 27, wherein the satellite access site equipment comprises at least one of a central controller, a power converter system, and an auxiliary power system.

29. The method of claim 21, further comprising connecting one or more of the components of the satellite access site with a fleet of non-geostationary satellites through the Internet or other network.

30. The method of claim 29, further comprising automatically calibrating pointing and acquisition components of the one or more of the components of the satellite access site connected with the satellites.

31. The method of claim 30, further comprising causing the one or more of the components of the satellite access site connected with the satellites to communicate with the satellites to cause data to flow from the Internet or other network to the satellites and to one or more user terminals.

32. The method of claim 17, wherein the receptacle substructure further includes at least one connector for allowing pivotal movement of the end and/or the side wall relative to the base, or allowing the end and/or side wall to be detached from the base, or for allowing pivotal movement of the end wall and/or the side wall relative to the base and allowing the end wall and/or the side wall to be detached from the base.

33. The method of claim 17, wherein the receptacle sub-structure further includes a top wall or top wall sections.

34. The method of claim 33, wherein the receptacle sub-structure further includes at least one connector for at least one of pivotally and removably attaching the top wall or top wall sections to the at least one wall allowing pivotal movement of the top wall or top wall sections relative to the at least one wall, or allowing the top wall or top wall sections to be detached from the at least one wall, or for allowing pivotal movement of the top wall or top wall sections relative to the at least one wall and allowing the top wall or top wall sections to be detached from the at least one wall.

35. The method of claim 33, further comprising automatically pivoting the top wall or top wall sections in a controlled manner with a slow release mechanism or allowing the top wall or top wall sections to be at least one of manually pivoted and manually removed in a controlled manner with the slow release mechanism.

36. The method of claim 33, further comprising fastening the top wall or top wall sections to the ground with a fastener.

37. The method of claim 17, further comprising automatically pivoting the end wall and/or the side wall in controlled manner with a slow release mechanism or allowing the end wall and/or the side wall to be at least one of manually pivoted and manually removed in a controlled manner with the slow release mechanism.

38. The method of claim 37, wherein the slow release mechanism is integrated with at least one of the at least one connector.

39. The method of claim 17, further comprising fastening the end wall and/or the side wall to the ground with at least one fastener.

\* \* \* \* \*